July 7, 1936. A. C. FISCHER Re. 20,029

PREFORMED COMPOSITION STRIP AND METHOD OF MAKING SAME

Original Filed Dec. 7, 1925

Inventor:-
Albert C. Fischer
By Albert H. Robinson Atty.

Reissued July 7, 1936

Re. 20,029

UNITED STATES PATENT OFFICE 20,029

PREFORMED COMPOSITION STRIP AND METHOD OF MAKING SAME

Albert C. Fischer, Chicago, Ill., assignor to The Philip Carey Manufacturing Company, a corporation of Ohio Original No. 1,882,792, dated October 18, 1932, Serial No. 73,931, December 7, 1925. Application for reissue January 31, 1934, Serial No. 709,238

22 Claims. (Cl. 154—2)

My improvement relates to rubberized pellets, viz., puffed grains, seeds, mineral wool pellets, sago, puffed rice, puffed wheat, fibrous matter which can be reduced to pellets, granules such as, cork, corn cobs, pithy matter, in fact any substance which may be inherently compressible, such as, sponge particles, certain seaweed, mosses, etc.

My invention relates to immersing these pellets in latex and drying them. This may be accomplished by spreading the granules upon a sheet and spraying the latex over the granules, and after the upper layer of latex is dry, these particles, adhered together by the latex, may be reversed onto another sheet and sprayed on the opposite side, so that the result will be a thin sheet of rubber having interspersed thruout the sheet, and closely adjacent to each other, small pellets incased in the rubber.

Figure 1:
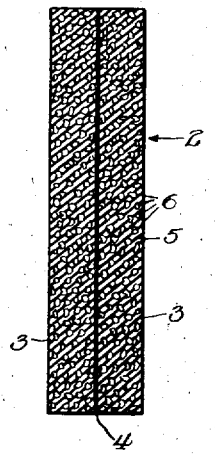
Figure 2:
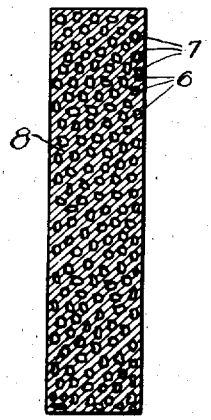

For a better understanding of the invention, reference will be made to the accompanying drawing, in which, Fig. 1 is a transverse section of laminated slab embodying my invention, and Fig. 2 is a transverse section of a non-laminated slab.

The invention is typified by a sheet or strip adapted to be employed in paving construction, such as streets, floors, walls and the like, to separate the concrete or other rigid sections of the construction at intervals and provide for contraction and expansion. Numeral 2 designates a laminated sheet or slab composed of two or more individual layers 3, superposed and adhered by a suitable adhesive layer 4. Each of the individual layers are fabricated from a composition comprising a mixture of rubber 5 and resilient granules 6.

An alternative structure of non-laminated form is shown in Fig. 2. This in composition may be the same as the single layers 3 in Fig. 1 except of increased thickness, or granules 6 may be coated with a thin layer of rubber 7, and the rubber coated granules then bonded with a bituminous binder 8.

Should it be desired, double layers of this material may be joined together by forming single layers, then joining the layers by spraying one of the layers with latex and placing the other layer thereon. This sheet may be passed thru a vulcanizing medium, suitably arranged therefor, in order to vulcanize the rubber incasing said granules.

This sheet may be used for various construction materials, such as an inner core for an insulation material and floor covering. It may be used for the center core of asphalt masses for compressible expansion joints, for various waterproofing purposes where waterproofing and insulation qualities are desired, also where resiliency and compressibility are desired.

Where the pellets are surrounded by the latex individually and not formed into a sheet they may be incorporated with other materials, such as, plaster, asphalt and any suitable binding material. When formed individually the pellets are simply saturated and removed from the saturant, allowing same to dry, but when prepared in a sheet they are uniformly distributed on a moving sheet, and the latex sprayed thereon in an uncoagulated state, it being understood that the latex herein described is a commercial latex in the uncoagulated state, approximately thirty-three (33%) per cent rubber, two (2%) per cent ammonia and sixty-five (65%) per cent water. When used as an expansion joint any suitable binding material may be employed which is waterproof, ductile and elastic, and these pellets incorporated therein and mixed therewith in any proportion, depending upon the resiliency required in the expansion joint.

In using these pellets for expansion joints it is preferred that they be vulcanized before being incorporated in the asphalt, or they may be vulcanized at the time of incorporation with the binding material by mixing the vulcanizing agent with the binding material, which is readily heated and maintained at a temperature at which raw rubber is vulcanized.

When utilized as an expansion joint in the sheet form the preferred method would be to vulcanize the sheet and pass the same between suitable rolls, enveloping the sheet in asphalt or any suitable binding means, or such binding means which may contain fibrous matter to prevent oozing of the product. It can be readily understood that said rubber sheet, containing granular matter, would act as a very resilient material for expansion joints. When incorporated as an insulation material the sheet may be placed between two plaster layers rolled over the sheet by suitable rollers in form of plaster, the fibrated plaster being utilized for the purpose, or the granules themselves may be mixed with the plaster and the mass rolled into sheet form.

When utilized as insulation material it would be important that the contents of the granules be insulation material, such as, mineral wool, asbestos fibre, or the like, infusorial earth, or some form of pellet which is good as an insulator.

The rubber casing will tend to deaden the sound, keep out the heat or cold as the case may be. When utilized as a floor covering the material would preferably be built-up in layers.

The invention is simple in form. Any suitable immersing machinery may be utilized, and a moving belt may carry the pellets away from the vulcanizing medium and permit it to dry as desired. When utilized in the sheet form a simple contrivance may be used for a moving belting arrangement, said belting surface being treated with talc or the like to prevent adhesion. The pellets are then fed on said belt or contrivance so as to form uniform distribution thereover, and a spraying device erected over said belt, such as is usually employed for paint spraying, which will disperse uncoagulated latex and spray particles as they pass thereunder. The spraying would naturally form a coating over the granules and join them together into a uniform sheet.

Any conveying arrangement can be erected over the lower conveying belt and the sheet then formed fed onto the upper conveyor belt, with the uncoated sides of the granular matter exposed, and another sheet of coating incasing the granules in a continuous sheet of uncoagulated latex. This sheet may then be fed thru a vulcanizing medium, or may be employed in the object for which it is to be used without vulcanizing, if so desired.

I claim:

1. The method of producing sheet material comprising a commingled mass of granular material and rubber binding material consisting in spreading granular material upon a surface, coating the exposed surface of the granular material with rubber, the application of the rubber being supplied to the granular material in sufficient quantity to leave a surplus of the rubber between the confronting surfaces of the granules in the form of connecting webs, and then forming the rubber coated granular material into a sheet.

2. The method of producing sheet material comprising a commingled mass of granular material and rubber binding material consisting in spreading granular material upon a surface, spraying the exposed surfaces of the granular material with rubber, the application of the rubber being supplied to the granular material in sufficient quantity to leave a surplus of the rubber between the confronting surfaces of the granules in the form of connecting webs, and then forming the rubber coated granular material into a sheet.

3. The method of producing multiple layer sheet material of the class described, which consists in producing a commingled mass of granular material and rubber binding material by spreading granular material upon a surface, coating the exposed surfaces of the granular material with rubber, the application of the rubber being in sufficient quantity to leave a surplus between the granules in the form of connecting webs, forming the mass of rubber coated granules material into two or more sheets, superimposing the two sheets, thus produced in juxtaposed relation, and applying a coating of rubber to the superimposed sheets for joining the same substantially as/and for the purpose described.

4. The method of producing sheet material of the class described, which comprises sifting a granular material evenly upon a surface, coating the exposed surfaces of the granular material with rubber latex, the latex being applied in sufficient quantity to form a web between adjacent granules, forming coated granules into a sheet, and finally vulcanizing said latex.

5. The method of producing sheet material of the class described, which comprises arranging granules of an inherently compressible material upon a surface, spraying a surplus of uncoagulated latex over said granules, forming the latex treated granules into a sheet, and finally vulcanizing said uncoagulated latex.

6. A preformed compressible and elastic expansion joint strip comprising a mass of resilient binding material and resilient elements distributed throughout said mass providing mass portions in which the resilient elements are freely contractible and expansible with the binding material.

7. A preformed compressible and elastic expansion joint strip comprising a mass of resilient binding material and resilient elements distributed throughout the mass, said resilient elements being arranged in close relation to allow adjacent elements to act resiliently against each other.

8. A preformed compressible and elastic expansion joint strip comprising a mass of binding material, resilient granular elements distributed throughout the mass, and a coating of vulcanized material surrounding each of the granular elements.

9. A preformed compressible and elastic filling unit comprising two or more composition layers, each of which is composed of a mass of resilient binding material and resilient granular elements distributed throughout the mass.

10. A compressible and elastic building material unit comprising a commingled mass of granular material and rubber binding material.

11. A compressible and elastic building material comprising a core of a commingled mass of granular material and rubber binding material, and a covering of asphaltic material.

12. The method of producing building material comprising coating the individual granules of a mass of granular material with rubber material, and forming the rubber coated mass in a sheet.

13. The method of producing building material comprising coating the individual granules of a mass of granular material with rubber material, forming the rubber coated mass into a sheet, and covering the sheet with asphaltic material.

14. A compressible and elastic building material unit comprising granules of elastic material and a binding material holding said granules together and cooperating therewith whereby the strip is readily compressible and contractible in character.

15. A compressible and elastic building material unit comprising granules of elastic material and a resilient binding material holding said granules together.

16. A compressible and elastic building material unit comprising a commingled mass of granular elastic material and a suitable binding material holding said co-mingled mass of granular elastic material together and cooperating therewith whereby the strip is readily compressible and contractible in character.

17. A preformed compressible and elastic expansion joint strip comprising cork granules, and a resilient binding material for said cork granules.

18. A preformed compressible and elastic expansion joint strip comprising a mass of vulcanized binding material and resilient elements distributed throughout said mass providing mass portions in which the resilient elements are fully contractible and expansible with the binding material.

19. A compressible and elastic building material comprising a mass of resilient granules and vulcanized binding material.

20. A compressible and elastic building material comprising a mass of resilient cork granules and vulcanized binding material.

21. An expansion joint for separating spaced rigid sections of a building or flooring construction comprising a strip interposed between the spaced sections of such construction, said strip comprising a body composed essentially of cork granules agglomerated by a suitable binder capable of cooperating with the compressibility of the cork granules whereby the strip may be compressed without oozing from the space between the sections and will expand upon contraction of said sections.

22. An expansion joint for separating spaced rigid sections of a building or flooring construction comprising a strip interposed between the spaced sections of such construction, said strip comprising a body composed essentially of resilient granules agglomerated by a suitable binder capable of cooperating with the compressibility of the resilient granules whereby the strip may be compressed without oozing from the space between the sections and will expand upon contraction of said sections.

ALBERT C. FISCHER.